(12) United States Patent
Postle

(10) Patent No.: US 9,815,148 B2
(45) Date of Patent: Nov. 14, 2017

(54) METAL CORED WELDING WIRE THAT PRODUCES REDUCED MANGANESE FUMES AND METHOD

(71) Applicant: Postle Industries, Inc., Cleveland, OH (US)

(72) Inventor: Christopher J. Postle, North Royalton, OH (US)

(73) Assignee: Postle Industries, Inc., Cleveland, OH (US)

( * ) Notice: Subject to any disclaimer, the term of this patent is extended or adjusted under 35 U.S.C. 154(b) by 753 days.

(21) Appl. No.: 14/211,507

(22) Filed: Mar. 14, 2014

(65) Prior Publication Data

US 2014/0263248 A1    Sep. 18, 2014

Related U.S. Application Data

(60) Provisional application No. 61/801,800, filed on Mar. 15, 2013.

(51) Int. Cl.
*B23K 35/30* (2006.01)
*B23K 35/40* (2006.01)
*B23K 9/24* (2006.01)
*B23K 9/173* (2006.01)
*B23K 35/02* (2006.01)

(52) U.S. Cl.
CPC .......... *B23K 35/3073* (2013.01); *B23K 9/173* (2013.01); *B23K 9/24* (2013.01); *B23K 35/0244* (2013.01); *B23K 35/0255* (2013.01); *B23K 35/0261* (2013.01); *B23K 35/0266* (2013.01); *B23K 35/0272* (2013.01); *B23K 35/308* (2013.01); *B23K 35/3026* (2013.01); *B23K 35/404* (2013.01)

(58) Field of Classification Search
CPC ............ B23K 35/0244; B23K 35/0255; B23K 35/0261; B23K 35/0266; B23K 35/0272; B23K 35/3026; B23K 35/3073; B23K 35/308; B23K 9/173; B23K 9/24; B32K 35/404
See application file for complete search history.

(56) References Cited

U.S. PATENT DOCUMENTS

| 2004/0173592 A1* | 9/2004 | Duncan | B23K 9/04 219/137 WM |
|---|---|---|---|
| 2004/0232131 A1* | 11/2004 | North | B23K 35/368 219/145.22 |
| 2013/0092674 A1* | 4/2013 | Gerth | B23K 35/0205 219/145.21 |
| 2013/0266820 A1* | 10/2013 | Kusinski | C22C 38/04 219/137 R |
| 2013/0270244 A1* | 10/2013 | Barhorst | B23K 9/167 219/137 R |
| 2014/0097168 A1* | 4/2014 | Ferree | B23K 35/3026 219/145.22 |
| 2014/0353285 A1* | 12/2014 | Langham | B23K 35/3086 219/73.11 |

* cited by examiner

*Primary Examiner* — Geoffrey S Evans
(74) *Attorney, Agent, or Firm* — Tarolli, Sundheim, Covell & Tummino LLP

(57) ABSTRACT

Various embodiments of a metal cored wires and methods are disclosed. In one embodiment of the present invention, a metal cored wire comprises a metal sheath and a metal-powder core material comprising manganese particles. The manganese particles are coated with a coating material to reduce the manganese fumes and exposure during welding.

20 Claims, 1 Drawing Sheet

METAL CORED WELDING WIRE THAT PRODUCES REDUCED MANGANESE FUMES AND METHOD

RELATED APPLICATION

This patent application claims priority to Application Ser. No. 61/801,800 entitled "Metal Cored Welding Wire That Produces Reduced Manganese Fumes and Method" filed on Mar. 15, 2013 and which is incorporated by reference herein.

FIELD OF THE INVENTION

The present invention relates generally to metal cored welding wires, and methods for making and applying the welding wire. More specifically, the present invention relates to metal cored welding wires and methods for making and using welding wire that contains manganese.

BACKGROUND

Metal cored wire is used in industry to apply metal welding wire onto the surface of industrial parts or components. The vast majority of welding wires, also known as electrodes, are a low carbon elongated metal wire that is welded to a metal base material to build, reinforce, or repair the part to extend the utility of the part that is subjected to high frictional forces and abrasive forces. The elemental composition of the metal cored wires can vary greatly depending upon the application requirements.

Manganese is a common element used in the making of steel welding wire. As the welding wire is melted, the fumes that are generated. The Occupational Safety and Health Administration (OSHA) has set a limit of 5 mg. manganese per cubic meter (5 mg/m3) of work-place error for the average amount of manganese during an 8 hour work day. Efforts to safeguard employees against reduce welding fumes in addition to upgrading ventilation systems, using respirators, and alternative welding methods is desirable.

SUMMARY

The embodiments of the metal core wires herein reduce manganese welding fumes while also meeting application performance requirements. In one embodiment of the present invention, a metal cored wire comprises a metal sheath and a metal-powder core material comprising manganese particles. The manganese particles have a coating to reduce the manganese fumes emanating from welding wire thereby reducing the exposure to manganese. In one embodiment the coating is a material that reduces the oxidation of manganese and decomposition.

In another embodiment, a process for making the metal cored wire comprises blending manganese particles that are coated with a different material and placing the mixture of metal powder inside the sheath to form a metal cored wire.

In yet another embodiment, a method for welding an industrial product comprises welding the metal wire to an industrial product to form a metal alloy on the surface of the industrial product. The metal wire comprises a metal sheath and a metal powder core material comprising coated manganese particles.

BRIEF DESCRIPTION OF THE DRAWINGS

The various embodiments of the present invention can be understood with reference to the following drawings. The components in the drawings are not necessarily to scale.

DETAILED DESCRIPTION

Various embodiments of welding wires, hardband alloys, and methods are disclosed herein. It will be appreciated that the present invention could be employed across a variety of industrial applications.

Figure 1:
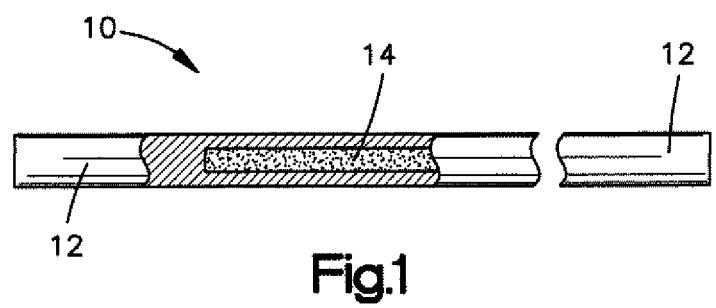
FIG. 1 is a schematic illustration of the longitudinal section of a metal cored welding wire, according to an embodiment of the invention.

FIG. 1 is a schematic illustration of a longitudinal section of a metal cored welding wire, according to an embodiment of the present invention. Metal cored wire 10 includes a metal sheath 12 and powder metal core 14. The cut-away view of sheath 12 shows powder metal core 14 inside the sheath, for example, metal powder particles that reside inside the central portion of the metal cored wire 10. The metal sheath 12 has a cylindrical annular geometry, although alternative geometries are possible.

The weight of the sheath and the metal-powder core, based on the total weight of the metal cored wire, can vary. In one embodiment the weight of the metal sheath ranges from about 60% to about 85% of the total weight of the metal cored wire, and the weight of the metal-powder core ranges from about 15% to about 40% of the total weight of the metal cored wire.

In the several embodiments of the present invention herein, a metal cored wire comprises a metal sheath and a metal-powder core material comprising manganese particles that are coated with a different material. In one example the coating on the manganese particles comprises a material that is inert or undergoes reduction in the presence of oxygen. The coating is non-oxidizing material and reduces the amount of manganese that decomposes to generate fumes. The coating material can include metal and can include, but is not limited to, metal or metal alloys that contain nickel, copper, cobalt, and molybdenum.

The size of the manganese particle used in metal cored welding wire may vary greatly, although in many applications, they typically have an average particle size ranging from about 0.025 millimeter in diameter to about 250 millimeters in diameter. Screen mesh can vary from about 60 to 320.

In any of the embodiments described above, the thickness of the coating material on each of the manganese particles can range from about 50 nanometers to about 50 microns, in another embodiment from about 500 nanometers to about 50 microns, in another embodiment from about 100 nanometers to about 100 microns, and in yet other example embodiment from about 1 micron to about 500 microns, from about 10 microns to about 100 microns, and from about 20 microns to about 40 microns. As mentioned above, the coating can include nickel, copper, cobalt, and molybdenum, a nickel alloy, a copper alloy, a cobalt alloy, a molybdenum alloy, and alloys thereof.

A metal cored welding wire containing manganese particles comprises by weight, based on the total weight of the metal cored welding wire, from about 0.25% to about 20%, in another embodiment from about 0.25% to about 5%; in another embodiment from about 0.25% to about 2%; and in yet another embodiment from about 0.5% to about 1.5% manganese particles. The amount of manganese in a Hadfield product is a higher amount and the weight of manganese based on the total weight of the meal cored welding wire, generally ranges from about 10% to about 24%, and in another embodiment from about 16% to about 20%. The amount of manganese present in the powder-metal core comprises, based on the weight of the metal powder core material ranges from about 0.25% to about 75%; in another embodiment from about 0.25 to about 10%; in another embodiment from about 0.5 to about 5%; and in another embodiment from about 1% to about 5%.

The amount of coating material present on the manganese can range from about 100 to about 1000 ppm, in another embodiment from about 0.001% to about 0.01% of the overall weight of the powder particles. The amount of coating, for example a nickel coating on manganese, can range from about 1% to about 50%, in another embodiment from about 1% to about 25%, in another embodiment from about 2% to about 10% based on the total weight of the powder particles.

Coating process technologies to coat the manganese particles include but are not limited to, sputtering, chemical vapor deposition (CYD), plasma deposition, and solution based coating, for example, electroless coating processes, such as an electroless nickel coating process.

In one embodiment, a method for making the metal cored wire includes blending manganese particles that are coated, and placing the mixture of metal powder inside the sheath to form a metal cored wire. In another embodiment the method includes coating the manganese particles with a material that is different by a coating process, including but not limited to the processes described above, prior to blending the manganese coated particles with a mixture of metal particles.

The type and amounts of elements can vary in low carbon steel welding wire and in stainless steel type welding wire. The composition of some common metal cored welding wire, for example, is listed in Table I below.

TABLE 1

| Element | Wt % Range |
|---|---|
| Mn | 0.25-1.5% |
| Ni | 0-2% |
| C | 0.02-0.12% |
| P | 0.001% |
| Si | 0.25-1% |
| Fe | Balance |

The metal cored welding wire has an overall metal composition comprising, by weight, based on the total weight of the metal cored wire: from about 0.25% to about 2% manganese; from about 0.02% to about 0.12% carbon; from about 0.001% to about 0.1% nickel; and the remainder is iron including trace elements.

The metal core welding wires are used to form, via welding, alloys onto the surface of industrial equipment. The diameter of the wire can vary and common wire diameter used for welding to form alloys include, but are not limited to, 0.045, 1/16 inch, 3/32, 7/64, and 1/8 inch, etc. The wall thicknesses of the sheath of the wire typically range from about 0.010 inch to about 0.030 inch, or as another example, from about 0.011 to about 0.016 inch, and can vary depending upon the diameter of the sheath.

The various embodiments of the metal cored welding wire described herein may be applied to new parts or products to increase the wear resistance of the part, or applied to older parts or products in order to restore a worn surface of the part and to extend the working life of the part or product.

Figure 2:
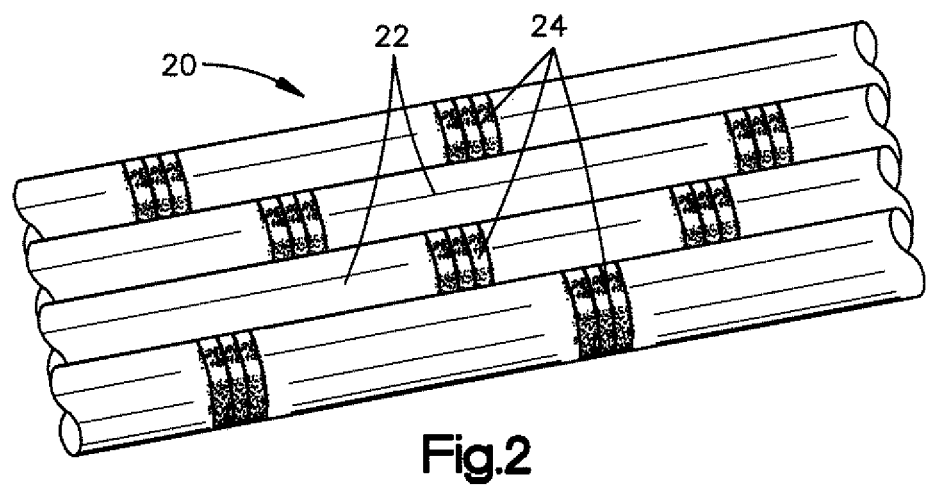
FIG. 2 is a schematic illustration of a plurality of drill collars having a hardband alloy formed thereon, according to an embodiment of the present invention.

The alloys produced from the metal wires protect equipment such as pipe, tools, and related components. FIG. 2 is a schematic illustration of a plurality of metal pipe, 20 having alloys 22 formed thereon, according to an embodiment of the present invention. The alloys 22 are formed by welding metal cored wires onto the pipe as disclosed herein.

Accordingly, a method for welding an industrial product comprises welding the metal cored wire of any of the embodiments described above to an industrial product. The metal cored welding wire comprises a metal sheath, a metal-powder core material, and the metal powder core material comprises manganese particles having a coating. In another embodiment, the manganese powder particles are coated with a material that includes, but is not limited to, nickel, copper, cobalt, and molybdenum, a nickel alloy, a copper alloy, a cobalt alloy, a molybdenum alloy, and alloys thereof.

The outer surface area of the equipment or component, whether new or previously used, can be inspected prior to welding and may be cleaned of debris, mst, paint, lubricants, and other foreign matter, and the surface may be preheated prior to the application of the weld wire. The wire may be welded to the surface of the tool using arc welding. Examples of possible welding processes include, but are not limited to, flux core arc welding (FeAW), gas metal arc welding (OMAW), and plasma arc welding (PAW). After welding, the weld deposit and tool are cooled at a gradual rate depending upon the application and environment for welding. Typically, the weld beads of the hardband alloy are up to about 25 mm wide and up to about 3 mm thick and can be deposited in single or double layers without spalling.

It will be appreciated that the hardband alloys produced by the metal cored wire in accordance with the embodiments of the present invention have a microstructure and composition that enhances service life of and performance of components across a wide variety of industries, including the oil and gas drilling industry.

While the present invention has been illustrated by the description of embodiments thereof, and while the embodiments have been described in detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A metal cored welding wire comprising:
   a metal sheath;
   a metal-powder core material comprising manganese particles; and
   wherein the manganese particles are coated with a coating material,
   and the coating on the manganese particles comprises a material that undergoes reduction in the presence of oxygen.

2. The metal cored welding wire of claim 1, wherein the coating on the manganese particles comprises a metal, and the metal cored welding wire comprises 0.25% to 24% by weight manganese, based on the total weight of the metal cored welding wire, and the metal cored wire comprises 0.001% to 50% coating material, based on the total weight of the metal powder core material.

3. A metal cored welding wire comprising:
   a metal sheath;
   a metal-powder core material comprising manganese particles which are coated with a coating material, and the coating on the manganese particles comprises a material selected from the group of: nickel, copper, cobalt, and molybdenum.

4. The metal cored welding wire of claim 3, wherein the coating on the manganese particles comprises nickel.

5. The metal cored welding wire of claim 4, wherein the nickel coating of the manganese particles is a nickel-alloy comprising at least 50% by weight nickel.

6. The metal cored welding wire of claim 3, wherein the metal cored wire comprises, by weight based on the total weight of the metal cored wire, from 0.25% to 2% by weight manganese.

7. The metal cored welding wire of claim 3, wherein the metal cored welding wire comprises, by weight, based on the metal powder core material from 0.5% to 2% by weight manganese.

8. The metal cored welding wire of claim 3, wherein the metal cored wire comprises, by weight, based on the total weight of the metal cored wire, from 0.001% to 0.2% by weight coating material.

9. The metal cored welding wire of claim 3, wherein the metal cored wire comprises, by weight based on the total weight of the metal cored wire, from 0.25% to 25% by weight manganese.

10. The metal cored welding wire of claim 9, wherein the metal cored welding wire comprises, by weight, based on the total weight of the metal cored wire, from 5% to 15% by coating material.

11. The metal cored welding wire of claim 3, wherein thickness of the coating ranges from 50 nanometers to 500 microns.

12. The metal cored welding wire of claim 3, wherein the weight of the metal sheath ranges from 60% to 80% of the total weight of the metal-cored wire, and the weight of the metal powder core ranges from 20% to 40% of the total weight of the metal cored wire.

13. The metal cored welding wire of claim 3, wherein metal cored wire comprises, by weight, based on the total weight of the metal cored wire:
from 0.25% to 2% by weight manganese;
from 0.001% to 0.5% by weight coating material;
from 0.02% to 0.12% by weight carbon; and
the balance iron.

14. The metal cored welding wire of claim 3, wherein metal cored welding wire comprises, by weight, based on the total weight of the metal cored wire:
from 0.25% to 2% by weight manganese;
from 0.001% to 1% by weight coating comprising a material selected from the group of nickel, copper, cobalt, and molybdenum;
from 0.02% to 0.12% by weight carbon; and
the balance iron.

15. The metal cored welding wire of claim 3, wherein metal cored welding wire comprises, by weight, based on the total weight of the metal cored wire:
from 0.25% to 2% by weight manganese;
from 0.001% to 0.5% by weight nickel;
from 0.02% to 0.12% by weight carbon; and
the balance iron.

16. A method of making a metal cored welding wire, the method comprising:
blending manganese particles that are coated with a coating material with particles of at least one metal different than manganese to form a mixture, the coating material comprising a material comprising a material selected from the group of nickel, copper, cobalt, and molybdenum; and
placing a metal sheath around the mixture of metal powder to form a metal cored welding wire.

17. The method of claim 16, wherein the thickness of the coating material ranges from 50 nanometers to 500 microns.

18. A method for welding an industrial product, the method comprising:
welding a metal cored welding wire to an industrial product to form a hardband alloy; and
wherein the metal cored welding wire comprises a metal sheath, a metal-powder core material, and wherein the metal powder core material comprises manganese particles coated with a coating material, the coating material selected from the group of: nickel, copper, cobalt, molybdenum and alloys thereof.

19. The method of claim 18, wherein the coating material comprises at least one of copper and nickel.

20. The method of claim 18, wherein the coating material of the metal cored welding wire comprises from 0.001% to 0.1% nickel, based on the weight of the metal cored welding wire.

* * * * *